United States Patent
Coowar et al.

(10) Patent No.: US 8,790,818 B2
(45) Date of Patent: Jul. 29, 2014

(54) MULTIFUNCTIONAL COMPOSITE

(75) Inventors: Fazlil Ahmode Coowar, Southampton (GB); Mark Andrew French, Kingston-upon-Thames (GB); Gary Owen Mepsted, Southampton (GB); Christopher Douglas James Spooner, Bracknell (GB)

(73) Assignee: Qinetiq Limited (GB)

( * ) Notice: Subject to any disclaimer, the term of this patent is extended or adjusted under 35 U.S.C. 154(b) by 508 days.

(21) Appl. No.: 13/139,854

(22) PCT Filed: Dec. 11, 2009

(86) PCT No.: PCT/GB2009/002857
§ 371 (c)(1),
(2), (4) Date: Jun. 15, 2011

(87) PCT Pub. No.: WO2010/070267
PCT Pub. Date: Jun. 24, 2010

(65) Prior Publication Data
US 2011/0256455 A1 Oct. 20, 2011

(30) Foreign Application Priority Data
Dec. 20, 2008 (GB) .................................. 0823260.5

(51) Int. Cl.
H01M 6/40 (2006.01)
H01M 6/46 (2006.01)
H01M 10/04 (2006.01)
H01M 10/0585 (2010.01)
H01G 11/50 (2013.01)
H01G 11/40 (2013.01)
H01G 9/02 (2006.01)
H01M 10/0525 (2010.01)

(52) U.S. Cl.
CPC .......... *H01M 10/0436* (2013.01); *Y02E 60/122* (2013.01); *H01G 11/50* (2013.01); *H01M 10/0585* (2013.01); *H01G 11/40* (2013.01); *Y02E 60/13* (2013.01); *H01G 9/02* (2013.01); *H01M 10/0525* (2013.01); *H01M 6/40* (2013.01)

USPC ......... 429/162; 429/247; 29/623.1; 29/623.2; 29/623.5

(58) Field of Classification Search
USPC ...................... 429/121–347; 29/623.1–623.5; 361/502–522
See application file for complete search history.

(56) References Cited

U.S. PATENT DOCUMENTS

| | | | |
|---|---|---|---|
| 5,540,742 A | 7/1996 | Sangyoji et al. | |
| 2003/0068559 A1* | 4/2003 | Armstrong et al. | 429/234 |

FOREIGN PATENT DOCUMENTS

| | | |
|---|---|---|
| EP | 0 730 316 | 4/1996 |
| EP | 0 814 520 | 12/1997 |

(Continued)

OTHER PUBLICATIONS

Thomas et al., "Composite Material with Multifunctional Structure-Power Capabilities", American Society for Composites (ASC) 16th Technical Conference Proceedings, CD-Rom, M.W. Hyer and A. C. Loos Eds., Virginia Tech. Blacksburg, VA, Sep. 9-12, 2001.

(Continued)

*Primary Examiner* — Kenneth Douyette
*Assistant Examiner* — James Lee
(74) *Attorney, Agent, or Firm* — McDonnell Boehnen Hulbert & Berghoff LLP

(57) ABSTRACT

A multi-functional, laminated composite comprises a plurality of cloth layers (3) penetrated by an infused matrix, wherein at least one cell (1) for energy storage is supported by and integrally built up from at least one of the cloth layers (3), the cell (1) being embedded in the matrix. The cell may comprise first and second electrodes (6,7) separated by a porous, separator layer (2) that has a liquid electrolyte-permeable, matrix-free intra-electrode region to which the electrolyte (2') may be added before or after resin infusion to activate the cell. The structural composite may have integrated energy storage comprising a lithium-ion rechargeable cell, optionally of printed construction.

20 Claims, 11 Drawing Sheets

(56) References Cited

FOREIGN PATENT DOCUMENTS

| JP | 61269859 | 11/1986 |
| JP | 09035730 | 2/1997 |
| WO | WO 93/11571 | 6/1993 |
| WO | WO 96/38025 | 11/1996 |
| WO | WO 2007/036705 | 4/2007 |
| WO | WO 2007/125282 | 11/2007 |
| WO | WO 2007/134308 | 11/2007 |

OTHER PUBLICATIONS

Neudecker et al., "Power Fibers: Thin-Film Batteries on Fiber Substrates", ITN Energy Systems, Inc., Littleton, CO., (2003).

Snyder et al., "Multifunctional Structural Composite Batteries for U.S. Army Applications", US Army Research Laboratory, Weapons and Materials Research Directorate, Sep. 2007.

* cited by examiner

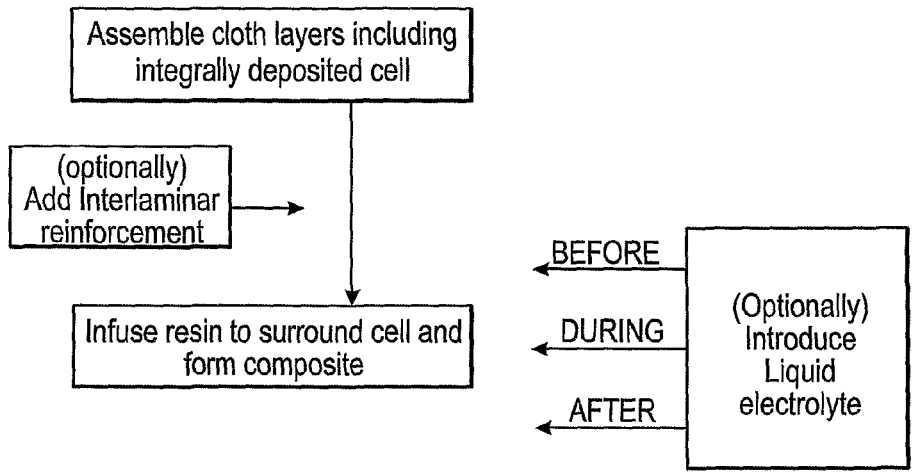
*Fig. 9a*
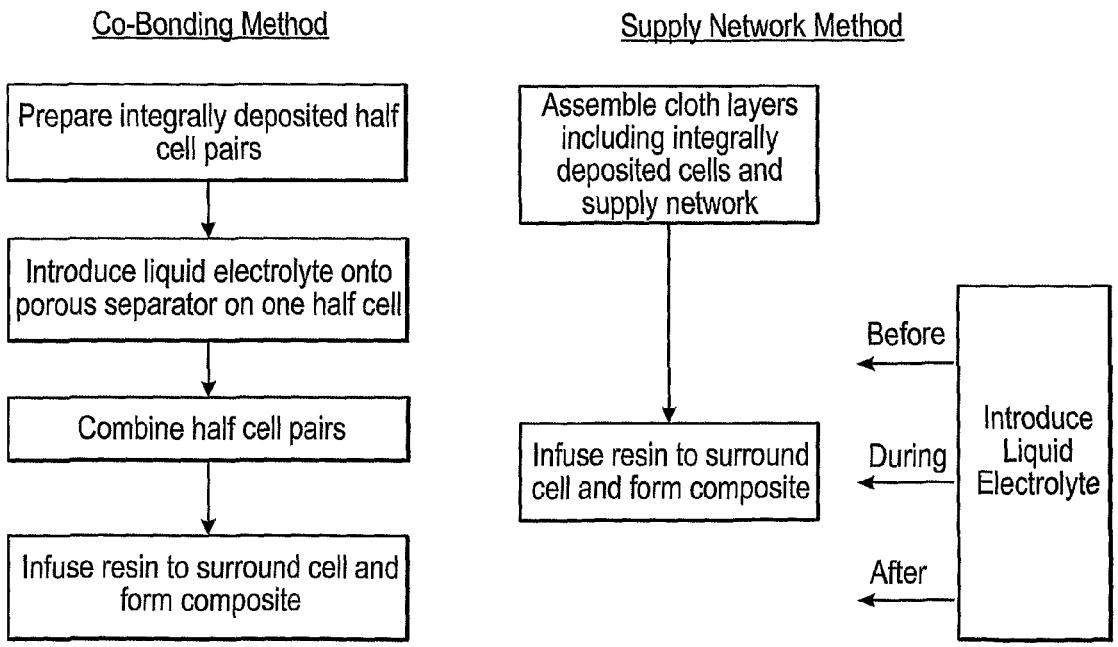
*Fig. 9b*     *Fig. 9c*

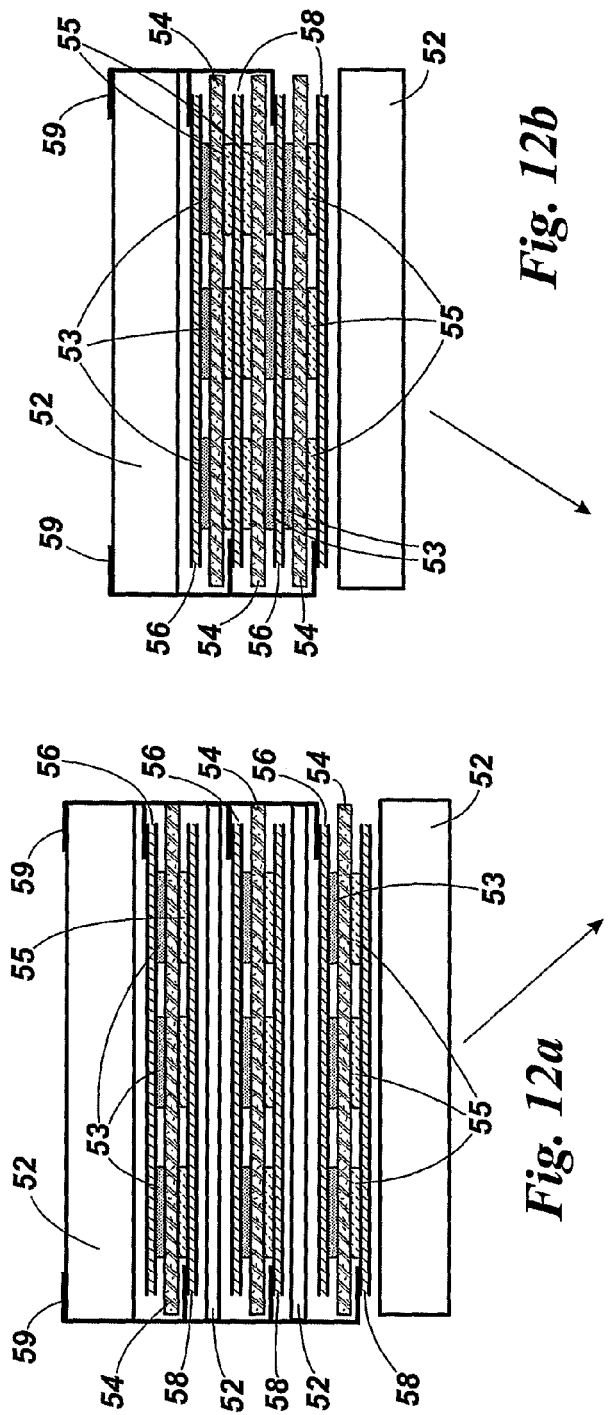
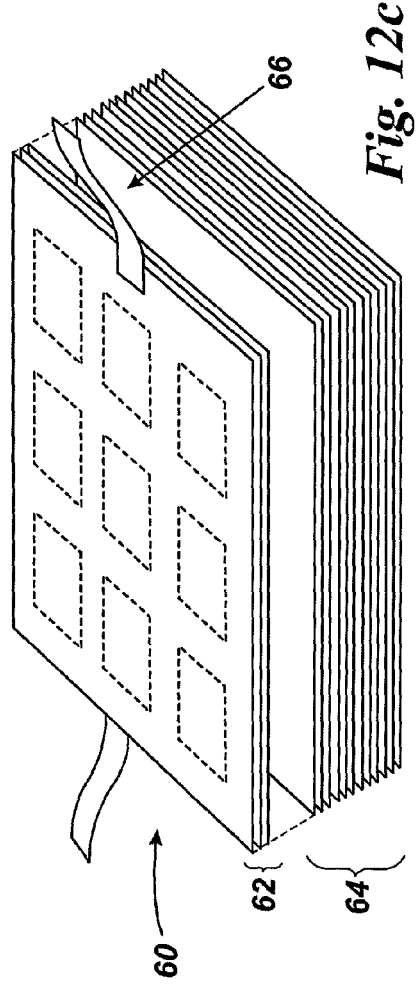

MULTIFUNCTIONAL COMPOSITE

BACKGROUND OF THE INVENTION

1. Field of the Invention

The present invention relates to multifunctional composite materials, and methods of making the same. It particularly relates to structural composite materials exhibiting power storage functionality, especially fibre reinforced composite (FRC) materials with integrated energy storage devices, and methods for their production.

2. Description of the Related Art

In many modern structures use is made of fibre/matrix composite materials and in particular fibre/resin composite materials. These are frequently fabricated from one or more cloth layers of a fibre, such as, for example, glass, Kevlar®, Dyneema®, or carbon fibres, formed into a woven fabric or a mat, together with some permeating polymeric resin matrix. However, the permeating matrix may also be provided by the use of pre-impregnated cloth layers "prepegs" or by infusable thermoplastic films interleaved alternately between untreated cloth layers.

Applicant's earlier patent application WO 96/38025 is directed towards a laminated composite material comprising a plurality of cloth layers and a penetrating resin matrix material, wherein at least one of the cloth layers has deposited thereon a patterned layer of electrical conductor, which can be produced by screen printing of conducting inks and is capable of providing electrical connectivity to an embedded electronic device.

In recent years, attempts have been made to develop multifunctional composite materials in order to optimise system performance and, in particular, to develop electric energy storage devices that also perform a structural function. For example, in a micro air vehicle (MAV), a device such as a battery, supercapacitor or fuel cell will add weight and bulk to the MAV and, in fact require the structure to support that device. If, instead, a multifunctional energy storage device can be designed that contributes rather than detracts from the mechanical strength or stiffness of the MAV, considerable size or weight savings may be possible. DARPA funded a program, as described in the article: American Society for Composites (ASC), 16th Technical Conference Proceedings CD-ROM, M. W. Hyer and A. C. Loos, Eds., Virginia Tech, Blacksburg, Va., Sep. 9-12, 2001., which developed a structure battery system for MAV's, which system was based on PLiON™ battery technology. The PLiON cells comprised a laminate of active electrodes and polymer matrix containing liquid electrolyte, which were sealed in laminated polymer/metal chemical barrier layer enclosures in view of the moisture sensitivity of the Li-ion electrolyte. The PLiON materials were then reinforced with compatible structural materials to improve mechanical strength. This is an example where structure function was added onto a known battery functionality.

In 2000, ITN Energy Systems, Inc. developed "PowerFibres"™, which are solid-state thin-film batteries deposited upon individual fibre substrates. The thin component layers are built up by vacuum deposition with a lithium phosphorous oxynitride glass electrolyte known as "LIPON"™ used as the solid electrolyte. Similarly, the US Army Research Laboratory proposed the use of structural polymeric composites based on solid electrolytes. Their battery functionality comprised carbon fibre fabric anodes, fibreglass separator layers, cathode coated metal meshes and a structural solid polymer electrolyte binding the components together so as to transfer load to the other components. WO 2007/125282 proposes the use of a structural supercapacitor in which the electrodes are formed from mats of conducting fibres bound by an electrolytic resin. However, the combining of electrical and structural functions can often lead to poor electrical capacities, in view of the use of non-optimal cell components.

In relation to cell manufacture, it is known to use screen printing techniques for the fabrication of cell elements. U.S. Pat. No. 5,540,742, for example, is directed to a method of fabricating thin, flexible cells involving screen printing various cell elements onto foil layers. EP 0 814 520 discloses printing a thin layer of separator precursor solution onto a cell electrode and drying and curing the layer to form a microporous separator layer.

SUMMARY OF THE INVENTION

In a first aspect, the present invention provides a multifunctional laminated composite comprising a plurality of cloth layers penetrated by a matrix material, wherein at least one cell for energy storage is supported by and integrally built up from at least one of the cloth layers, the cell being embedded in the matrix.

By "integrally built up from" it is meant that the cell components are laid down and built up from an area of a cloth layer, so that the cell is fabricated upon, and starting from, the at least one cloth layer substrate. At that interface the components and layer become inextricably linked together so as to form a single integral part, with the cloth layer substrate supporting the at least one cell. This is in contrast to an approach where the cell is created as an entity in its own right and then somehow adhered to a cloth layer, with the consequential risk of subsequent delamination along the line of adhesion between the cloth and cell.

According to the present invention, the cell components must be built up integrally (e.g. by printing, deposition methods, spraying or other suitable similar methods) from the cloth layer, but that does not exclude the possibility that the cloth layer may already have inherent preinstalled features (such as conductive fibres woven in a pattern to act as a current collector) that may also contribute to the cell function. As compared with prior art approaches to multi-functional composites, which either attempt fully to merge battery and structural functions, or, attempt subsequently to add a battery to an existing structure, this represents a hybrid approach. The cell can be constructed using typical cell materials and is incorporated into the composite prior to matrix material infusion (e.g. by liquid resin infusion or by the deliberate melting of thermoplastic layers laid up in advance between the cloth layers), remaining fully operational and substantially matrix-free but surrounded by matrix after infusion. The one or more cells are sandwiched as matrix-free islands between the cloth layers of the composite. While regions of the cloth layers and other layers may pass through and thus be incorporated in one or more cell structures, the cloth layers and cells still represent different components of the composite (i.e. where the cloth layer extends beyond the cell and the cell components extend beyond the cloth layer). Where the cloth layer extends beyond the cell supporting it within the composite, the cell cannot be encased in a sealed packaging envelope since it is built up integrally from the cloth layer.

A substantial area of each cell-bearing layer preferably will not contain any cells so that the structure is not unduly compromised (preferably no more than 80% of the area contains cells, more preferably no more than 50%). Also, preferably no more than 75%, more preferably 50% of cloth layers are cell-bearing layers.

Usually, a cell's structure will be sandwiched between two adjacent cloth layers but will not extend beyond either of those layers. The cell's entire outer periphery may be resistant to matrix ingress (e.g. resin ingress) for example, by adhesive seals at joins and/or by coating the cloth layers to seal them and render them impervious.

The term "cloth layer" is intended to be construed broadly to cover any layer formed of fibres that is suitable for incorporation into a fibre/matrix composite, and may comprise woven or laid fibres or an otherwise partially porous web-like structure, provided that it is susceptible to penetration by matrix material. Such a cloth layer may be a woven or non-woven fibrous mat and the fibres maybe continuous or chopped/short fibres. The cloth layer may or may not be an active cell component (for example, a specialist conductive carbon cloth could be used as an electrode); usually, however, traditional structural materials will best perform the structural role and traditional cell components will best perform the cell role.

While the matrix will usually be provided by infusing a liquid resin into the cloth layers, it can be provided by any suitable method and could for example be provided in the form of interleaved thermoplastic or thermosetting films or foils that melt and infuse under heat and pressure, or by appropriate use of pre-impregnated layers. It will be appreciated that the use of such layers may yield better control of the final structure.

In a second aspect, the present invention provides a composite in which the cell chemistry is based on a liquid electrolyte. Such an arrangement might initially appear unattractive due to the need to prevent matrix-liquid electrolyte interactions and because a liquid-containing region represents an area of weakness within an otherwise solid composite. However, the matrix of the composite can act as an effective seal for a liquid electrolyte-containing cell, hence obviating the need for additional protective cell packaging with its attendant weight, which packaging particularly in the case of Li ion-containing electrolytes usually needs to contain at least one substantially thick metallic layer to provide the required moisture barrier. Moreover, vastly superior cell performances can be achieved where liquid electrolyte based cells are integrally built up upon the cloth layers, because of the superior ionic conductivity of liquid electrolytes as opposed to solid or gel electrolytes.

The present invention further provides a multi-functional composite comprising a plurality of cloth layers and a penetrating matrix material and having at least one cell for energy storage incorporated therein, wherein the cell is integrally deposited upon at least one of the cloth layers and comprises first and second electrodes separated by a porous, separator layer that has a liquid electrolyte-permeable, matrix-free intra-electrode region.

The liquid electrolyte-permeable, matrix-free intra-electrode region may or may not contain a liquid electrolyte but should be inherently adapted to receive and operate with a liquid electrolyte. Thus the present invention encompasses multi-functional composites with one or more cells either already containing liquid electrolyte, or, dry precursor cells intended for subsequent use with liquid electrolyte. For example, it may be preferable to further machine or pre-install the composite, prior to activating the cell by means of an electrolyte filling stage.

Liquid electrolyte may be disposed within the liquid electrolyte-permeable, matrix-free intra-electrode region of the porous, separator layer.

The composite may comprise a supply network for supplying liquid electrolyte to the intra-electrode region.

The multi-functional composite may be specially adapted for later back-filling with liquid electrolyte, for example, after resin infusion. The composite will advantageously comprise a (matrix-free) supply network for backfilling the empty cell, or a series of such cells, with liquid electrolyte. Capillary tubes may be inserted into the composite for supplying the liquid electrolyte, or, alternatively, integral channels or flow-paths may be present within the composite for supplying the liquid electrolyte. Such a network may be partially or wholly provided by the separator layer and this layer may be commonly shared by a number of cells. For example, a porous separator layer commonly shared by a number of cells may have pairs of impervious (e.g. epoxy) tracks defining between them flow paths to the respective intra-electrode regions for supplying liquid electrolyte thereto.

A composite already containing liquid electrolyte may or may not contain a supply network, depending on how the cell was assembled (i.e. the electrolyte could have been supplied to the separator after it was laid down and before the next electrode was applied) and whether or not the supply network was subsequently removed.

The at least one cell may be integrally built up from only one cloth layer. Thus, a cell may be supported by a single cell-bearing cloth layer. A single cloth layer may also support multiple cells and these may either be arranged in a random or periodic array whereby each cell occupies a respective region of the cloth layer, or, two or more cells may be arranged in a stack upon one another over the same region of a single cloth layer.

Alternatively, a cell, or a stack of cells arranged directly upon one another, may be supported at either end by a different cloth layer, each end of the cell or stack being integrally deposited on each cloth layer. In a highly preferred composite, the cell comprises a pair of half cells, each of which is integrally built up upon a cloth layer prior to the half cells being brought together to form a cell. Thus a cell may also be supported on both of its outer faces by a cloth layer. Usually, the composite is formed from a stack of equally sized, over-laid cloth layers, pairs of adjacent (cell-bearing) cloth layers supporting pairs of half cells.

A plurality of cells may have their positive and negative terminals respectively connected to one another (in parallel) and may be integrally deposited on a single cell-bearing layer, or, on a pair of opposed cell-bearing cloth layers each supporting half cells, and in either event may be referred to as a "cell pack". A cell-bearing layer or a cell pack may occupy a single flat or curved plane. For some cell chemistries, a single cloth layer may be able to have half cells for different batteries printed on both its two opposing faces. Usually, a stack of two or more cell packs will be overlaying one another; there will usually be a minimum of 3, preferably at least 10 and more preferably at least 20 overlaying cell packs. These may occupy a series of parallel, respective single, flat or curved planes.

The composite may comprise two or more cells that share a common separator layer extending between them, which separator may be a solid polymer electrolyte or a porous solid separator intended for use with a liquid electrolyte. The separator layer may have substantially the same dimensions as the respective cloth layers, all such layers becoming matrix/resin infused and contributing to structural strength.

Advantageously, in the cell or half cells, all the respective electrode components are laid down by being integrally deposited as thin layers upon the cloth layer or upon one another. This improves cell integrity as compared with the electrodes and any current collectors merely being laid down or adhered to one another as separate items.

It may be advantageous for any separator layer that is present to be provided as a separate integral item, especially if it is commonly shared between cells and becomes partially matrix/resin infused so as to provide a structural role. However, all cell components may be integrally deposited including any separator layer. For example, a liquid electrolyte permeable separator may be obtained by spraying a suitable precursor solution that can be treated to become a porous separator layer.

The components that are integrally deposited may be applied using any suitable deposition, printing, painting or similar technique that allows the component to be built up upon an substrate, including vacuum depositing, painting, rolling, embossing, printing or spraying, and this may involve templates or masking to achieve a desired shape or outline. Many suitable patterning techniques that allow a thin layer to be laid down in a particular pattern or shape will be known to the skilled addressee, such as, for example, screen printing, spraying, stencil printing, flexographic printing, gravure printing, inkjet printing, embossing and the like.

Advantageously the multi-functional composite comprises a plurality of matrix (e.g. resin) infused cell-bearing cloth layers overlaying one another and additionally held together by inter-laminar reinforcement. Such reinforcement may be achieved by means of tufting, stitching, stapling, pinning processes or the like extending, preferably substantially perpendicular, between and through adjacent cloth layers so as to secure them together; any other suitable processes known to those skilled in the art may be used. The composite may comprise cells in respective cloth layers that are substantially aligned on top of one another. In that case, the reinforcement may be provided in the gaps between the cells. For some applications, cells in different layers of the composite may be staggered with respect to one another so they do not overlap, or they only partially overlap. Their pattern may vary in a regular manner between adjacent layers and repeat every two or every three layers, etc. This may improve uniformity within the composite, for example, evening out thicknesses or ensuring the un-bonded intra-electrode regions, which are areas of weakness, are spread evenly throughout the composite.

The laminated composite may comprise only one cell on the at least one cloth layer, but may comprise two or more such cell-bearing cloth layers. More usually, two or more cells may be disposed on the same face of the same cell-bearing cloth layer The cells will usually be spaced from the panel edge (by at least 5 mm) so that there is a certain thickness of matrix infused composite to provide a moisture barrier and for structural integrity. The panel will usually have a continuous matrix-infused border around its edge surrounding and protecting the cells.

In the multi-functional composite, the one or more cells, where they are isolated by non-conductive cloth layers, may be provided with external connectivity. By "provided with external connectivity" it is meant that the one or more cells are linked via electrically conductive paths and/or other cells in the matrix-infused structure with the outside of the composite. This may be provided as conductive paths (e.g. conductive ink printed tracks or otherwise deposited busbars) either on the cloth layer(s) bearing the cells or half cells, or, laid down on a separator layer, if provided, lying between the opposed electrodes of the one cell, or if commonly shared, a plurality of such cells.

Preferably, current collectors are provided to supply current across each cell since preferred anode and cathode inks will usually have too high internal resistance over longer distances. Such current collectors will usually be linked to the afore-mentioned conductive paths. Current collectors may be formed of high conductivity materials, preferably being printed from high conductivity inks such as, for example, those containing silver, gold, platinum, copper or nickel. Metals suitable for use on the anode or cathode sides for specific cell chemistries will be known to the skilled person. A shielding layer may be used to prevent any liquid electrolyte from contacting a current collector material that is unstable under the required half cell operating voltages. In lithium ion based cells, it is better to avoid using carbon layers as a shielding or sealing layer on the anode side, since it may suffer from irreversible lithium ion intercalation.

The cloth layers may be provided with subsequently applied, current collection layers in the locations of the respective active cell areas and these may be provided by printing, deposition, etc, where the cloth layer is non-conductive (e.g. glass fabric) or is insufficiently conductive to perform a current collection role. However, the cloth layers may be inherently capable of current collection and may be uniformly conductive across their area, for example, where the glass or carbon fabrics are interwoven with sufficient metal filaments to perform as current collectors without the need for an additional current collecting layer to be interposed between the cloth layer and active electrode material. In that case, dielectric layers of a larger area need to be used to prevent cross circuits across adjacent cloth layers, since the entire layers will be at the generated potential even though the active cell areas are localised. Alternatively, the cloth layer may be provided with localised, pre-prepared, integral conductive regions corresponding to the active cell areas that function as current collectors, for example, patches containing pre-woven metallic fibres or other metallic treatments; such cloth layers would not suffer from potential cross circuits.

In the composite, one or more non-cell-bearing (i.e. normal) cloth layers or other dielectric layers (preferably porous to resin) may be laid up adjacent a cell-bearing cloth layer to prevent cross circuits, due to any conductive ink that has penetrated through the cloth layers.

The composite may be a continuous fibre reinforced composite, where the reinforcing fibres are most typically glass, Keylar™, Dyneema™ or carbon fibres but could be any other suitable material used to obtain a particular property from the composite (e.g. fire resistance).

The composite may be in the form of a flat or curved panel. This may form a structural panel, such as a vehicle bulkhead or perform a variety of other functions (e.g. acoustic panel, protective panel, fire resistant panel, etc.) as well as performing a valuable secondary function as a power source.

In the composite, each cell may be a battery or supercapacitor, and is preferably a liquid electrolyte based cell such as a non-aqueous battery (e.g. Li Ion) or aqueous battery (e.g. nickel metal hydrides). The use of lithium ion based rechargeable cells is preferred as they can be used many times and have the highest energy density of any known chemistry.

The present invention further provides a method of preparing a multi-functional composite as specified in the first aspect having at least one cell for energy storage incorporated in the matrix, comprising the steps of:— i) assembling a plurality of cloth layers, wherein the at least one cell is integrally built up from at least one of the cloth layers; and, ii) infusing a matrix material into the cloth layers including the at least one cloth layer to form a matrix that penetrates the layers and hardens to form the composite.

The present invention further provides a method of preparing a multi-functional composite as specified in the second aspect having at least one cell for energy storage incorporated in the matrix, comprising the steps of:— i) assembling a plurality of cloth layers, wherein the at least one cell is integrally built up from at least one of the cloth layers, each cell comprising first and second electrodes separated by a porous, separator layer that has a liquid electrolyte-permeable intra-electrode region for receiving liquid electrolyte; and, ii) infusing a matrix material into the cloth layers including the at least one cloth layer to form a matrix that penetrates the layers but not the intra-electrode regions and hardens to form the composite.

The latter method may further comprise the step of:

iii) introducing a liquid electrolyte into the intra-electrode regions, wherein the electrolyte filling step occurs before, during or after the matrix infusion step.

While the above-mentioned matrix infusion steps will usually involve infusing a liquid resin into the structure, it may alternatively involve the activation of any precursor matrix material already laid up in the structure for example as alternating thermoplastic or thermosetting films or foils or pre-impregnated cloths, from which matrix material may be generated under heat/pressure and penetrate into the neighbouring porous cloth layers.

The electrolyte introduction step iii) may be conducted prior to matrix (e.g. resin) infusion step ii) by introducing the liquid electrolyte directly onto the porous separator while the cell is being laid up. Where respective half cells are combined to form the cell, this may be done immediately prior to the half cells being combined. The electrolyte may be delivered onto a separator layer overlaying one face-up half cell, where the half cells are each framed by raised adhesive borders, before laying down the other half cell, and bonding by pressure such that the borders merge.

The electrolyte introduction step iii) may be conducted after matrix (e.g. resin) infusion step ii) via a supply network through which the liquid electrolyte is introduced into the intra-electrode regions. Step i) may include the laying down of a network of capillary tubes leading to the respective intra-electrode regions.

In either method, the composite may have any of the features hereinbefore mentioned.

In either method, in step i) each cell may be initially formed as a pair of half cells, each of which is integrally built up upon a cloth layer, prior to combining the half cells. Each half cell may be framed by a raised adhesive border such that, upon combination, usually under pressure, they form a seal to prevent subsequent matrix ingress. This may also permeate and seal any separator layer in the vicinity of the border area. The adhesive may be a contact adhesive (i.e. one allowed to dry in advance which then bonds upon contact with little pressure required).

In either method, step i) may further include adding inter-laminar reinforcement to secure the cloth layers together prior to the matrix-infusion step ii) but post half cell bonding, where half-cells are employed.

The present invention additionally provides any novel feature or novel combination of features hereinbefore mentioned.

The present invention additionally provides a multifunctional laminated composite comprising a plurality of cloth layers penetrated by a matrix, wherein at least one cell for energy storage is provided upon at least one of the cloth layers, the cell being surrounded by the matrix and not encased in a sealed packaging envelope. The cell may be of flat or curved planar construction (as opposed to cylindrical or concentric cell constructions) and cells may be stacked in a parallel configuration on neighbouring cloth layers. The cell does not need to be encased in separate packaging to seal it, or to hold it tightly together in the case of half cells, as the matrix (e.g. a resin) provides this function.

The present invention additionally provides a laminated composite comprising a plurality of cloth layers and a penetrating resin matrix material and having at least one cell for energy storage incorporated therein, wherein each cell is integrally disposed upon at least one cloth layer, the cell comprising first and second electrodes separated by a porous separator layer and liquid electrolyte disposed therein in a resin-free intra-electrode region.

The present invention in a further aspect comprises the use of an adhesive to fabricate a cell from two half cells, wherein the adhesive forms a border around the entire cell perimeter so as to bind the two half cells together and seal the active cell area. The adhesive is preferably a contact adhesive, and is preferably pre-curable to a tacky state. The cell may contain a liquid electrolyte. The upper and lower faces of the cell may be impervious to prevent loss of liquid electrolyte and sealing layers may be provided on the outer surfaces of the upper and lower faces of the cell.

BRIEF DESCRIPTION OF THE DRAWINGS

Preferred embodiments of the present invention will now be described, by way of example only, with reference to the accompanying drawings in which:—

FIGS. 9a to 9c are flow diagrams depicting the respective steps of various alternative assembly methods;

FIGS. 12a and 12b are respective sectional views of two alternative multifunctional composite constructions on carbon/metal filament current collector fabrics using single and double sided cells, respectively, with FIG. 12c providing a schematic diagram of the final composite panel;

DETAILED DESCRIPTION OF PREFERRED EMBODIMENTS

Embodiments using Glass Fibre Cloth Composite Panels

Composite Panel Structure

In these embodiments, the panels are formed from non-conductive glass fibre cloths that are unable to act as current collectors.

Figure 5:
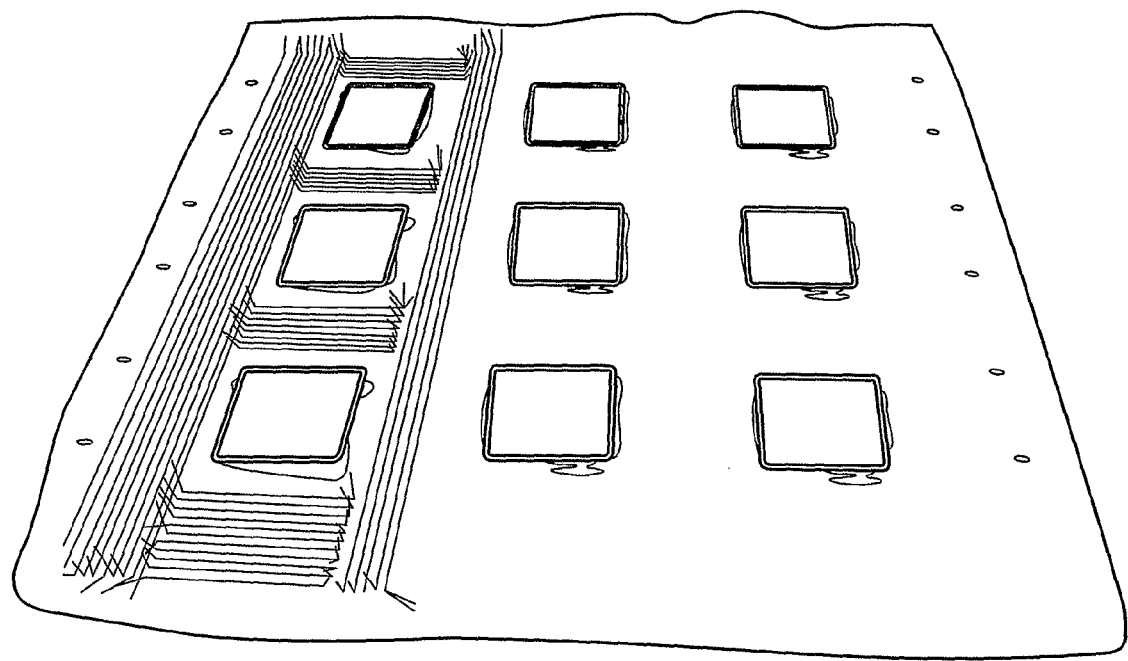
FIG. 5 is a photograph of a composite panel during the inter-laminar reinforcement stage, prior to the resin infusion step.

FIG. 5 is a photograph of a prototype CFRC (continuous fibre reinforced composite) panel during construction according to the invention; it is intended for use as a multifunctional structural panel. In this preferred embodiment, the composite panel comprises integrated lithium ion battery cells for use for as energy storage. Since the cells are effectively packaged by the surrounding matrix, the inherent structural weight can carry out both the required structural function and the protective packaging function with minimal/zero increase in weight.

The panel is formed of a stack of glass fibre cloths which include a number of cell-bearing cloths that have previously had the battery cells laid up thereon in a desired arrangement. The stacked cloth layers are held together by vertical stitching extending through all layers, as shown partially completed in FIG. 5. The final stitching pattern is shown schematically in FIG. 6. Once stitched together, the layers are subjected to a resin infusion step to form the final hardened composite panel. A liquid electrolyte filling step also needs to be carried out at some stage during assembly, before the cells become fully operational, as discussed further below.

Cell Structure

As the panels are formed from non-conductive glass fibre cloths, in these embodiments the cell structure needs to include current collector layers coated onto the cloth layers.

Figure 1A:
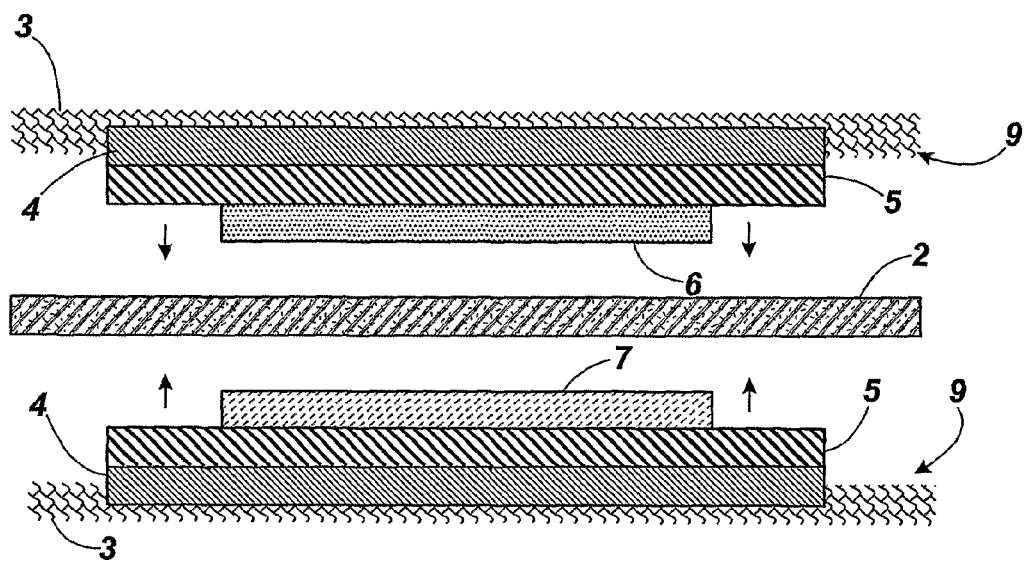
FIGS. 1a and 1b are respective sectional views of a single cell formed from two half cells before and after its assembly.
Figure 1B:
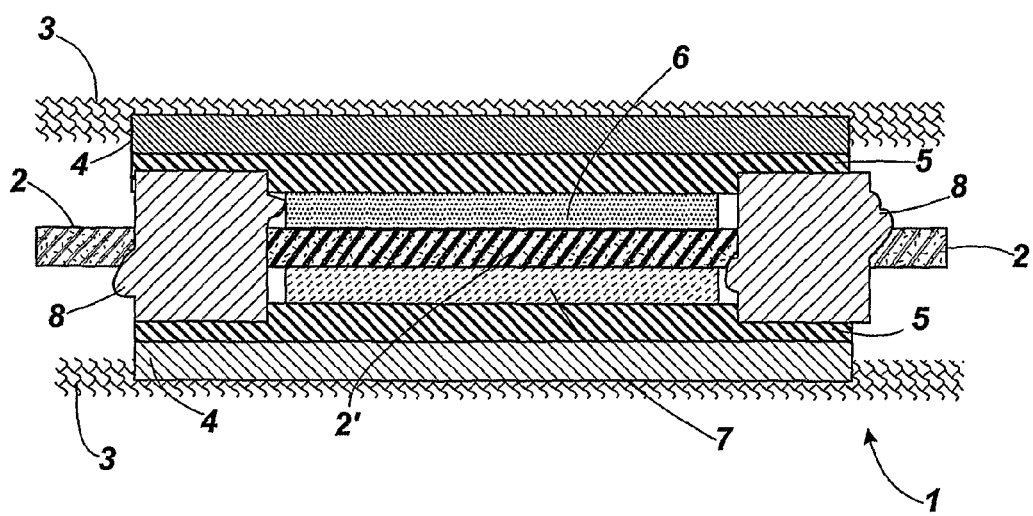

The final assembled structure of one of the Li-ion cells is shown in FIG. 1b. The cell 1 is formed from two rectangular half cells 9. The cross section of said cells is depicted individually in FIG. 1a. Each half cell 9 is integrally deposited on a respective structural glass fibre cloth 3, and comprises an electrode layer 6/7, shielding layer 5, and current collector layer 4, in that order lying upon the glass cloth layer 3. The half cells 9 are provided with continuous raised rectangular adhesive frames 8, and an intermediate porous separator medium 2 is placed between them, before they are bonded together to form the final cell. At some stage, a liquid electrolyte is permeated into the porous separator as shown by darker shading 2' in FIG. 1b.

This cell structure (using half cells) was selected as the most convenient for the prototype composite panel.

Alternative Cell Lay-up

Figure 10:
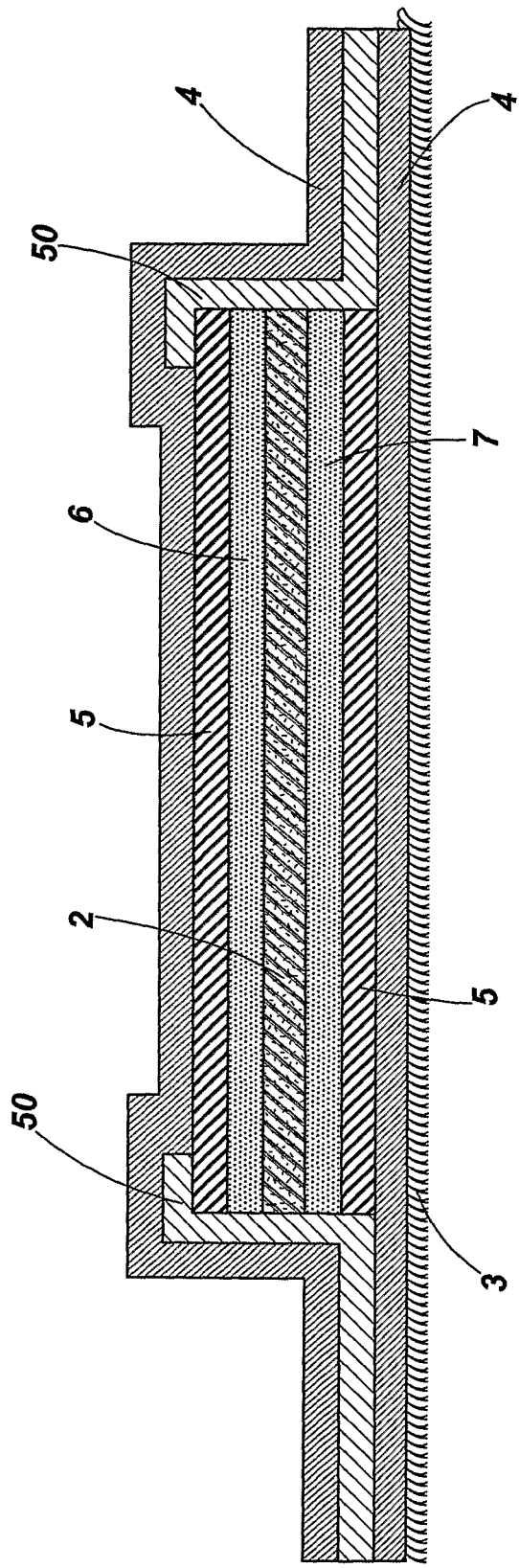
FIG. 10 is a sectional view of an alternative single cell formed upon a single cloth layer.

FIG. 10, however, shows an alternative cell structure that could be used, where the entire cell has been laid up on only one cloth layer. Cell components that correspond to those of the FIG. 1b cell are numbered correspondingly. This cell has the advantage that it does not contain the framed adhesive regions and underlying current collector borders, reducing the cell weight and dimensions. Instead a dielectric layer 50 is built up by screen printing dielectric ink in a number of passes.

Materials and Methods

Cell Chemistry

Lithium-ion battery technology was chosen for this application as it offers the highest energy density of any rechargeable battery system that is currently available on the market. The chemistry requires a structure such that anode and cathode are separated by a porous separator, which is saturated with liquid electrolyte to enable transportation of charge between anode and cathode. In this preferred embodiment, the anode consists of graphite, the cathode of lithium cobalt oxide ($LiCoO_2$), and the liquid electrolyte consists of lithium hexafluorophosphate ($LiPF_6$) in a solution of a mixture of ethylene carbonate (EC) and ethyl methyl carbonate (EMC).

Screen Printing as a Preferred Method

The cell materials were laid down onto the two cloth layers by screen printing the materials directly onto the structural glass fibre cloths 3. This is an ideal method to deposit the precise patterned layers needed. Moreover, it is easily scalable and hence, large area prints consisting of multiple printed layers can be cost-effectively manufactured by screen printing.

A flat-bed screen printer was used that takes a range of woven polyester, stainless steel mesh and stencil screens. Certain materials required for the proposed cell structure benefited from extremely high coat weights, a feature that is harder to achieve using the standard polyester mesh screens; hence those higher coat weights were attained by using stencil screen printing. It will be appreciated, however, by those skilled in the art that any suitable alternative printing or painting methods could be used to lay down the cell components.

Screen Printable Battery Materials

Where possible, screen printable materials were employed. A fully screen-printable solution would improve the ease and cost at which an embedded composite battery solution could be fabricated, but even just screen printing the electrode components (i.e. not separator/electrolyte) provides many advantages.

The anode and cathode materials are applied in the form of a screen-printable ink using a solution of polyvinylidene fluoride (PVDF) polymeric binder in a non-aqueous solvent N-methylpyrolidinone (NMP). The active material in the anode ink is a blend of graphitic materials; the cathode ink contains $LiCoO_2$ as the active material and carbon black as an electronic conductive enhancer.

While the anode and cathode ink conductivities are high enough to avoid posing a significant resistance to current flow through a typical printed thickness, current travelling along an appreciable length of the material would see an extremely high resistance. Therefore, conductive current collectors were used, onto which the active electrode materials were printed. There is a wide range of commercially available silver-loaded inks suitable for use as current collectors/bus bars. In this instance, Acheson Electrodag PF410 and 976 SS HV silver-loaded inks were used as the current collector. These inks have low temperature cures, the sheet resistance of which is as low as 0.01 ohms/square when printed on fabric.

It should be noted, however, that current collectors and/or bus bars need not necessarily be provided as printable inks. It is possible, for example, for the cloth layer to provide inherent connectivity in a preselected pattern, in which case the first component of the cell to be deposited upon the cloth layer might be the electrode ink. For example, a glass, or carbon or other fibre cloth could be woven with metallic filaments that provide electrical connectivity.

While the selected silver current collector composition provides good conductivity, silver is unfortunately not electrochemically stable for the entire voltage range over which a lithium-ion cell operates. Thus, in this instance, a non-porous shielding layer was needed between the current collectors and the composite electrodes to prevent electrolyte coming into contact with the silver. (Other known high conductivity inks however could be used (such as, for example, carbon nanotube inks), which would not require a shielding layer.)

Acheson Electrodag EB-023 was chosen as a shielding composition as this is designed to be electrochemically stable in the lithium-ion battery environment. It is a carbon-based product, but is not conductive enough to be used on its own as a current collector (having a sheet resistance of approximately 80 ohms/square at 10 microns thickness). This material can be screen printed although it is primarily designed to be sprayed.

In the present panel we used a porous separator 25 that was the same size as the cloth layers 24, 26 and stretched across multiple cells 1 of any particular cloth layer.

However, for the separator there is also an option of using a separator which can be printed or sprayed and is suitable for subsequent soaking with a liquid electrolyte. Such separators are known. For example, EP0814520 discloses a process for manufacturing a porous separator by printing a precursor solution, and drying so as to form a final separator that is then suitable for soaking with liquid electrolyte. In a preferred method, a micro-porous polymer separator may be obtained by using the dry phase inversion technique. In short, the polymer is dissolved in a solvent. An appropriate amount of non-solvent, which has a higher boiling point than the solvent and is miscible with the solvent, is then added slowly to the polymer solution. The overall mixture is then sprayed onto the electrode materials. On evaporation of the solvents, a micro-porous polymer membrane is obtained.

For the adhesive, Huntsman Araldyte 420 an aerospace-approved epoxy adhesive was chosen due to its stability under the electrochemical conditions of cycling a lithium ion cell and because it proved to be suitable for screen printing. However, a screen printable contact adhesive may alternatively be used.

As previously mentioned, the electrolyte consists of lithium hexafluorophosphate ($LiPF_6$) in solution of a mixture of ethylene carbonate (EC) and ethyl methyl carbonate (EMC).

General Assembly Method

Each half-cell was laid up as follows. First, the high conductivity silver current collector 4 was screen printed upon the glass fibre substrate 3. Then the intermediate carbon-based shielding layer 5 was screen printed over the entire current collector 4 to prevent it coming into contact with the electrolyte. The anode/cathode inks were then laid down in an order that depended upon which half-cell configuration was required. It was important that the capacity of the cathode matched the capacity of the anode. An excess cathode will result in the plating of lithium on the anode, which will render the cell unsafe. The anode/cathode material 7,6 was not printed to the boundaries of the current collector 4/shielding layer 5; instead, an exposed border (approximately 10 mm wide) of current collector/shielding layer was left all the way around each half-cell 9.

A rectangular adhesive frame 8 of the epoxy adhesive was then applied to each of the anode and cathode half-cells 9 over this exposed area to enable them to be bonded together to form a sealed chamber with the porous glass medium 2 sandwiched between. The epoxy frame packaging seal 8 can be better visualised in FIG. 3, which shows a three-dimensional representation of how each individual cell fits together and shows the individual epoxy frames 30. This could be saturated with the electrolyte either at this stage to form an active separator 2' just as it is sandwiched together, or subsequently after resin infusion.

However, before resin infusion could take place, it was necessary to assemble the whole composite panel.

Figure 3:
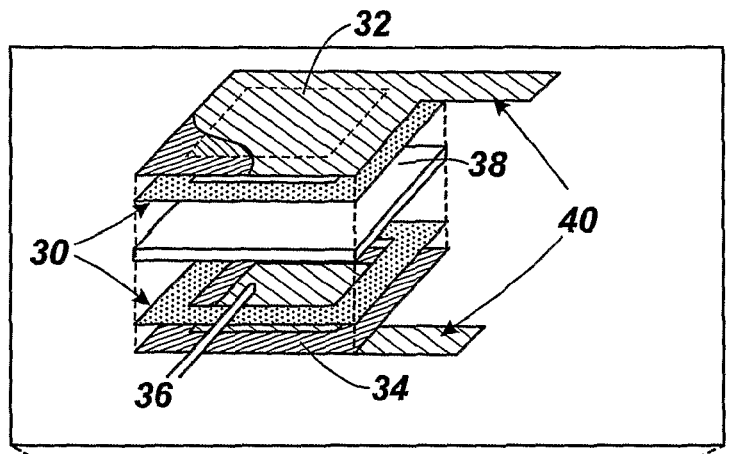
FIG. 3 is an exploded schematic view of one cell from a cell pack of FIG. 2.
Figure 2:
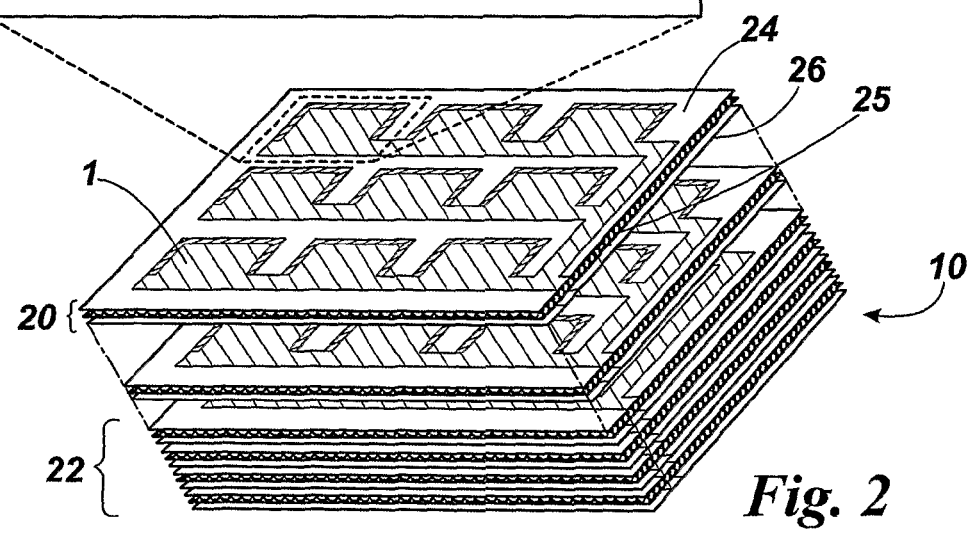
FIG. 2 is a schematic view of an exemplary composite panel formed from a stack of cell packs.

Turning to FIGS. 2 and 3, these show the arrangement of the discrete cells 1 on the cloth layers and how they are electrically connected by the busbars in the composite panel 10. The advantage of a screen printed technique is that many discrete cells 1 could be printed on each cell pack cloth layer 24, 26 in any conceivable arrangement and all cells could be connected to one another via the silver bus bars (also printed on the cloth layer 24, 26 using the same inks as the current collectors). An array of nine cells 1 were deposited as matching pairs of half cells 9 on opposing layers 24, 26 of woven glass cloth and were separated by the porous glass medium 25 to form a cell pack 20. (Although the cells were deposited on the inwardly facing sides of the cloth, the printed structures would still be visible through the outwardly facing sides— which is why their outline is shown in FIG. 2.)

These cell packs 20 were then aligned on top of one another in a stack 22 to obtain the required composite thickness— total storage capacity rising with each additional cell pack 20. The cell packs 20 were placed under vacuum/partial vacuum while the epoxy half-cell bond cured. The whole panel 10 was then filled with resin using resin infusion under flexible tooling (RIFT) and hardened.

As shown in a flow diagram in FIG. 9a, which depicts a generic process, inter-laminar reinforcement may optionally be introduced prior to resin infusion, and any liquid electrolyte may be introduced before, during or after resin infusion.

Figure 6:
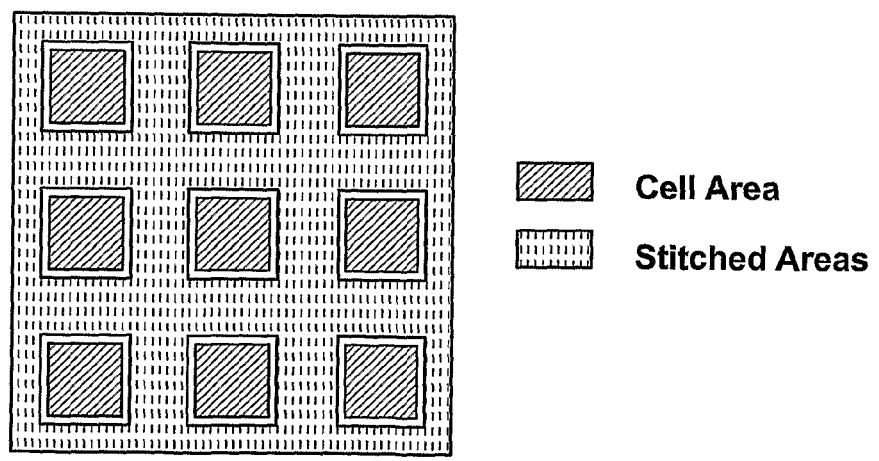
FIG. 6 is a schematic diagram showing the pattern of inter-laminar reinforcement intended for the composite panel of FIG. 5.

In this case, as mentioned above, the stacked cloth layers were held together by vertical stitching extending through all layers and located in the regions between the vertically aligned cells, as shown schematically in FIG. 6. Once stitched together, the layers were subjected to the resin infusion so as to provide the matrix.

It will be appreciated, however, that alternative matrix materials could be used. For example, alternating thermosetting or thermoplastic films or foils may be laid up in advance by interleaving between the untreated cloth layers, which films or foils upon the subsequent application of heat and/or pressure will infuse into the adjacent cloth layers to provide a permeating matrix. Pre-impregnated cloth layers may also be used in the composite, which are already tacky and can be subsequently cured to provide a penetrating matrix.

The alternative ways in which the electrolyte could be introduced are described below.

Liquid Electrolyte Filling Methods

As previously mentioned, the electrolyte consists of lithium hexafluorophosphate ($LiPF_6$) in solution of a mixture of ethylene carbonate (EC) and ethyl methyl carbonate (EMC). The electrolyte in a Li-ion cell is highly sensitive to moisture (any exposure to air will severely limit the battery performance). It should normally be introduced in dry room conditions to materials that have been vacuum dried for a number of hours, for example, at around 120° C. The electrolyte may be introduced into the cell cavities by a number of methods, either before, during or after resin infusion. Two alternative generic methods are represented schematically in flow diagrams in FIGS. 9b and 9c respectively.

1) Co-bonding Method: Referring to FIG. 9b, in this method, it is necessary first to lay-up the respective half cells and provide epoxy frames around each half cell. A measured amount of the electrolyte is then injected onto the porous separator layer after it has been positioned on top of the half-cell. The second half-cell is then positioned on top to seal the cavity. The cell packs are laid up and the half cell pairs bonded under vacuum/pressure. Resin is then infused and cured to form the composite.

2) Supply Network Method: Alternatively, a supply network may be installed in the structure, through which network the electrolyte can subsequently be supplied. While the electrolyte may then be introduced before, during or after resin infusion, post RIFT electrolyte introduction is preferred to avoid electrolyte interaction problems.

i) Post-RIFT Capillary Tube Filling

The half cells may again be prepared with epoxy frames but, as shown in FIG. 3, a capillary tube 36 is then placed across the bond line during lay up of the cell packs 20. These capillary tubes can be sewn into position during half cell fabrication using a semi-automated variation of the stitching process (discussed below) and would form a network exiting the panel. We have shown that syringes bonded to the free end of these tubes could then be used to fill an entire panel with a measured amount of electrolyte post-RIFT, with the tubes then being severed and sealed at the panel edge. Applicant's studies on similar-sized optical fibres indicate that such capillary tubes (if small enough) do not lower the structural integrity of a composite panel; usually, they will not affect the structural integrity providing they are smaller than the fiber tow diameter of the cloth.

While capillary tubes are readily employed in methods where half cells are prefabricated and then combined, they may be introduced in any lay-up method providing the open tube ends terminate in the inter-electrode region; for example, a single cell may be built up from one cloth layer with a tube introduced at the stage that the separator is provided.

ii) Variation on Capillary Tube Method

Figure 4:
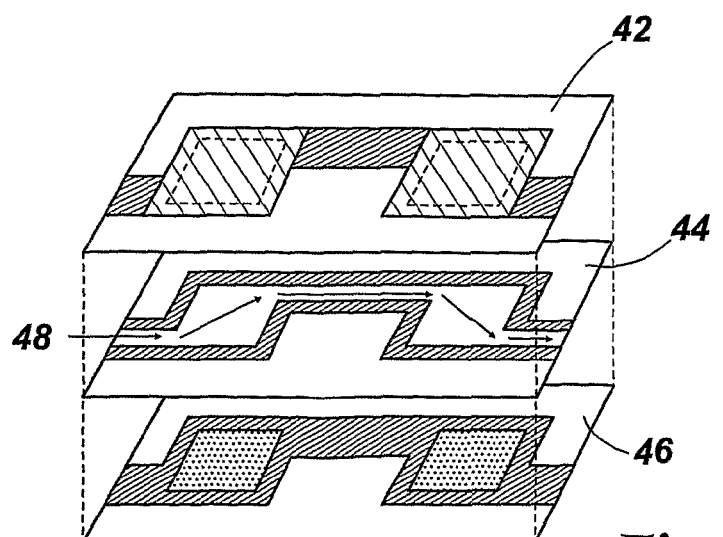
FIG. 4 is an exploded schematic view of two adjacent cells of an alternative construction, each formed from half cells.

A plumbing network can also be created for the electrolyte by printing. As shown in FIG. 4, the epoxy adhesive frames can be printed on the porous separator layer 44 (i.e. two epoxy seals either side of a porous track linking cells) to provide flow paths 48 between cells. The weight of adhesive printed needs to be sufficient fully to saturate the porous medium (e.g. glass fibre tissue) so that it can be used between the two opposing half cell pairs to bond them together. Electrolyte will be confined in the porous tracks due to the shielding layer/conducting bus bars printed in a corresponding manner around the cells on the cloth layers 42, 46.

Validation of Material System—Test Cells

Samples of the silver current collector Acheson Electrodag 976 SS HV (screen printed using 120/34 polyester mesh) were over-printed with the shielding layer Acheson Electrodag EB-023. Half-cell tests were conducted to check the electrochemical stability of the silver ink and the barrier qualities of the EB-023. It was necessary to prevent the electrolyte in the test jig seeping around the edge of the half-cell; this was achieved by avoiding the use of any cut substrate edges in the test jig cell. The results showed satisfactory silver stability—proving the EB-023 to be capable of protecting the silver current collector.

Small cells were created using the above-mentioned anode and cathode materials printed onto Fothergills Y0094 plain weave glass cloth, over a coat weight of EB-023 thick enough to seal the weave of the fabric. The cathode required 2 print passes of a 22/150 mesh polyester screen, while the anode used 4 passes of the same screen.

Figure 7:
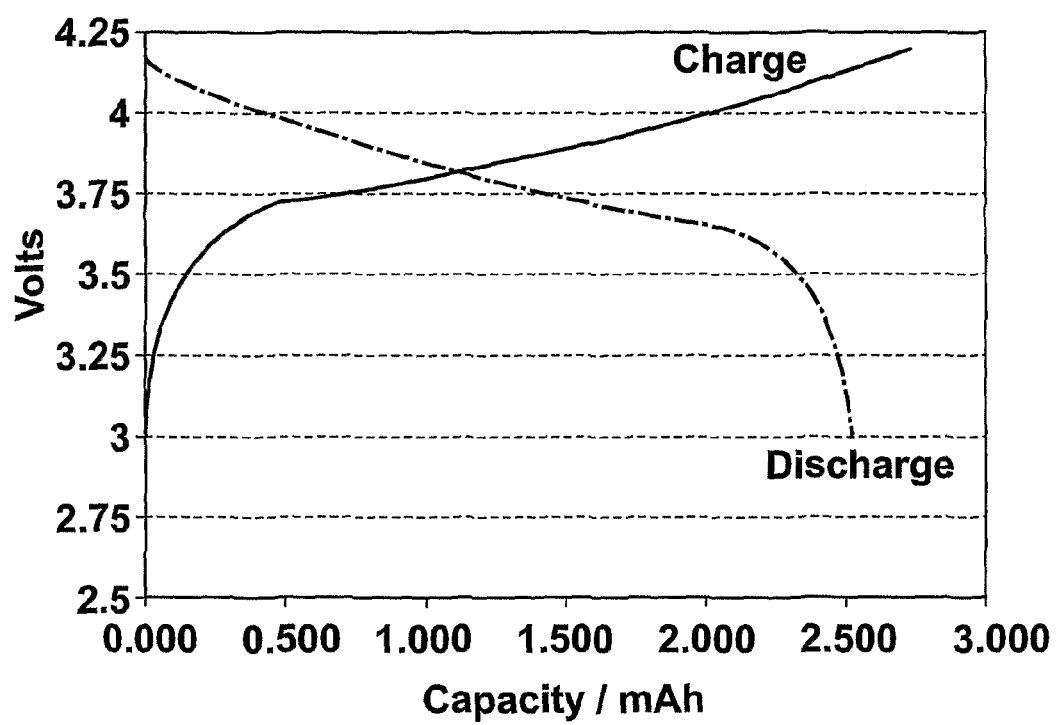
FIG. 7 shows the voltage profile for a test cell made from selected cell materials.
Figure 8:
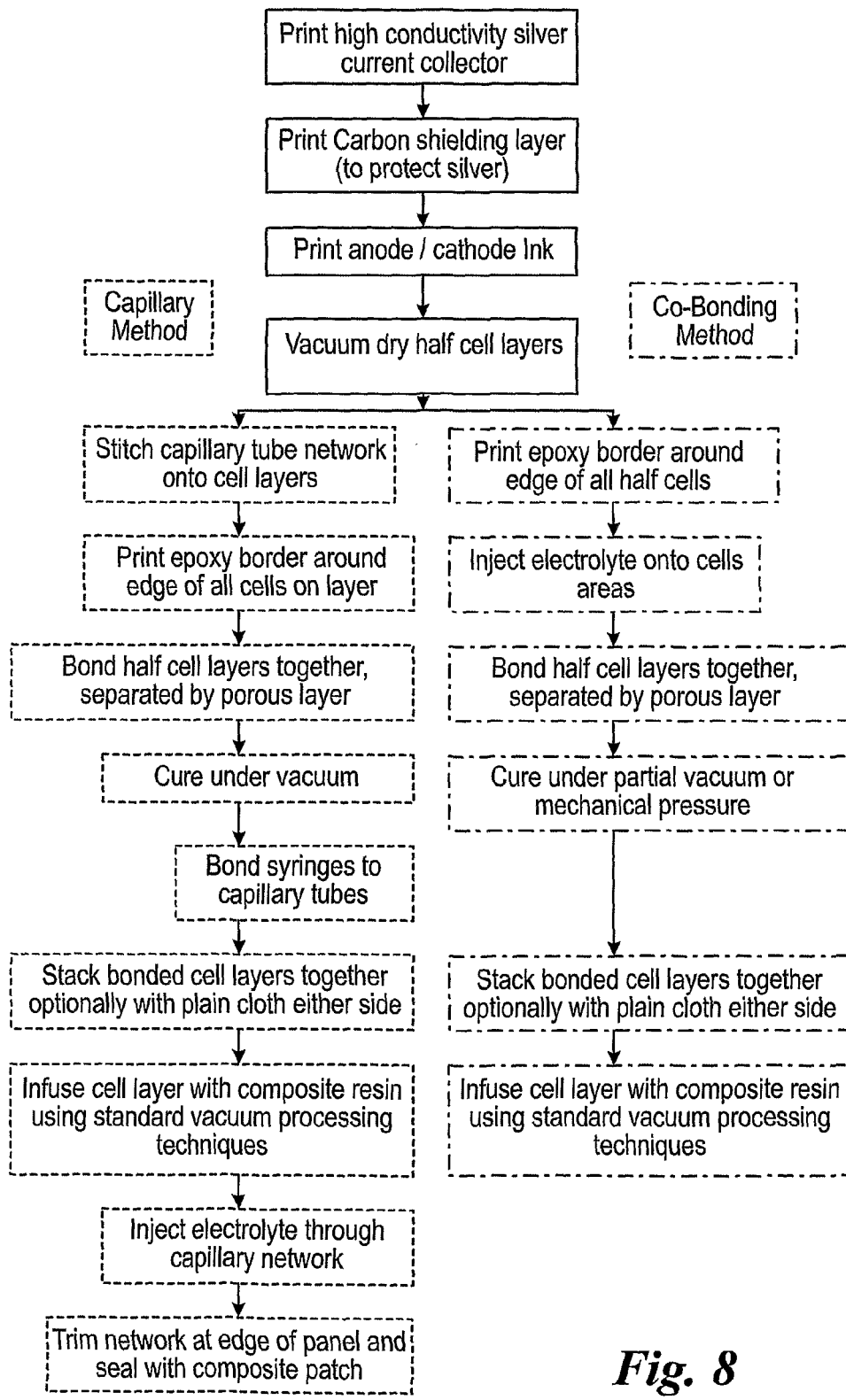
FIG. 8 is a flow diagram depicting the respective steps of a preferred capillary method and a preferred co-bonding method of forming composite panels.

FIG. 7 shows the voltage profile of the laboratory test cell comprising a composite LiCoO2 cathode and composite graphite anode, offset from one another by a glass fibre separator soaked in an electrolyte solution of 1 M LiPF6 in a solvent blend of EC and EMC. The area of the electrode was 1.13 cm$^2$. The cell was charged and discharged at a current of 0.3 mA between voltage limits of 3.0 and 4.2V. A discharge capacity of 2.5 mAh was obtained corresponding to a capacity density of 2.21 mAh/cm$^2$.

Expected Capacity of a Composite Panel

The cell capacity obtained from the test cell (tested under laboratory conditions using a jig), namely of 2.2 mAh/cm$^2$, gives a theoretical maximum capacity. Assuming a capacity of 2.0 mAh/cm$^2$, a 25 mm composite panel of area 12 m$^2$ could then have an expected power storage of 8.9 kWh, or provide a steady power supply of 1.3 kW for 7 hours. This is based on a 56% cell area coverage and 18 cell layers within the 25 mm panel thickness, with each cell layer assumed to be 0.8 mm thick, leaving 5.3 mm of plain composite either side of the cells to provide a barrier to moisture ingress. Other parameters would be:—

Operation temperature: −40° C. to +60° C.

Voltage: 3-4.2V

Capacity: Theoretical maximum of 2.2 mAh/cm2, giving 0.7 kWh/m2 of composite (assuming 56% area coverage and 18 layers)

Maximum current: 0.1 W/m2 composite (same assumptions as above with discharge rate C/7)

Embodiments Using Conductive Carbon/Metal Filament Cloth Composite Panels

The following embodiments employ panels formed from conductive carbon/metal filament cloths that are inherently capable of acting as current collectors, leading to a slightly different cell construction.

Figure 11A:
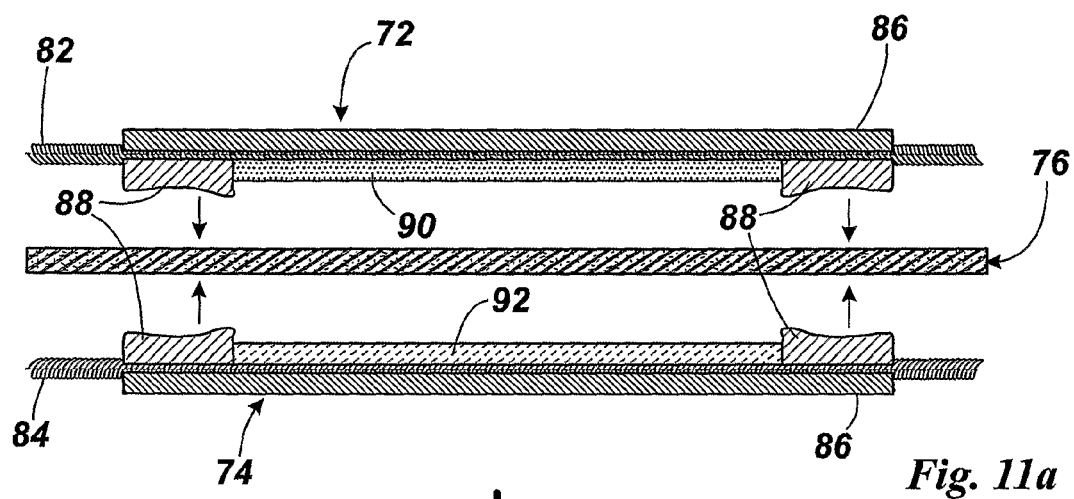
FIGS. 11a and 11b are respective sectional views of an alternative single cell formed from two half cells on carbon/metal filament current collector fabrics, before and after its assembly.
Figure 11B:
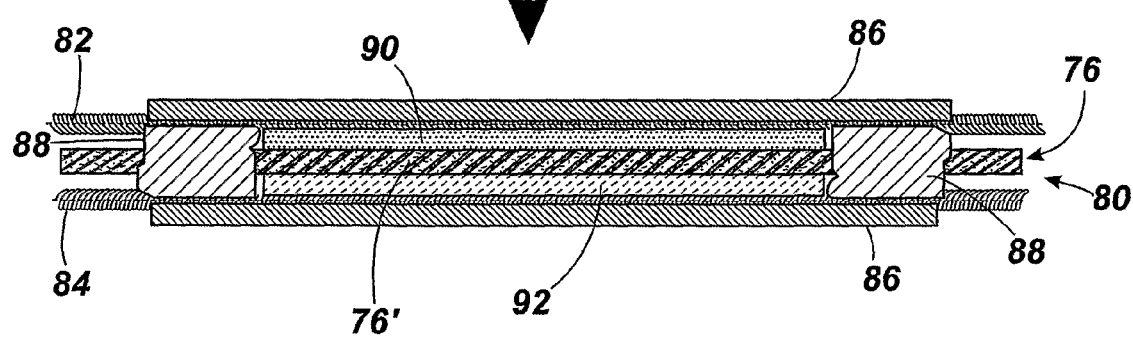

FIGS. 11a and 11b are respective sectional views showing an alternative single cell 80 formed from two half cells 72, 74 on carbon/metal filament current collector fabrics 82, 84, before and after its assembly.

Two fabric types are required for the carbon/metal filament fabrics to function as the respective current collectors. A carbon fibre cloth interwoven with aluminium filaments 82 was used for the cathode current collector and a carbon fibre cloth interwoven with copper filaments 84 was used for the anode current collector. Two metal filaments per carbon tow were woven in both the warp and weft directions, filaments preferably being as thin as possible (e.g. ~diameter 0.1 mm). The fabric itself was approximately 140 gsm (without metal filaments) and had as tight a weave as possible, giving a planar surface and an approximately 0.2 mm thickness per layer in the composite structure. A sheet resistivity of 0.0036 ohms/square was demonstrated in the carbon/copper fabric 84 (measurement taken over 9×250 mm) although carbon/aluminium fabric would be expected to have a higher resistance.

Active anode 92 and cathode 90 material was then screen printed directly onto the fabrics 84, 82. Depending on the weave, the weight of active material alone may be enough to seal the weave of the cloth, but in this example an extra sealing layer of a carbon ink 86 was used to keep electrolyte in and composite resin out during further processing. The carbon ink can either be printed before the active material on the same side of the substrate, or on the opposite side of the substrate, as shown in FIG. 11. A suitable non-particulate loaded polymer material (such as an epoxy) could also be used instead on the opposite side of the fabric to the active material as a sealant, so as to achieve the lowest porosity, provided that its effects on charge passage out of the active layer and into the woven fabric current collector are not detrimental.

Copper foil tabs (not shown) would be bonded to the edge of carbon fabric layers, for example, using a conductive adhesive such as a silver filled adhesive. Anode and cathode contacts would be arranged to exit the panel at opposite sides.

As the carbon/metal fabric is conductive over its entire area, a porous separator 76 (a glass tissue) was used to cover the entire surface of the plane between anode 92 and cathode 90. It needed to be larger then the anode/cathode fabric layers (i.e. extend past them at the edges of the panel) to prevent shorts. An alternative approach would be to use a sprayed porous separator (patterned into shape of the active cell areas) or a traditional porous PVDF film cut and positioned in such shapes. If this approach was used, a negative of the cell pattern (active areas) would need to be cut out of glass fabric and positioned over the areas between cells. Both methods have advantages and disadvantages as the skilled person would appreciate.

As a global porous separator 76 (glass tissue sheet) was being used between the half cells 72, 74, a liquid adhesive border 88 around the cell areas needed to be printed that would soak through the thickness of the porous material to confine the liquid electrolyte and bond the half cells together during cell stack assembly; Araldite 420 is a suitable epoxy adhesive for this purpose. (However, if the patterned sprayed porous separator/glass fabric negative approach was taken, then a contact adhesive could be used instead.)

To assemble the cell stack assembly, as in previous embodiments, the separator needs to be placed over the anode half cell and the adhesive applied, prior to the electrolyte application and the bringing together of the two half cells. The liquid epoxy adhesive needed to be printed in the dry room environment immediately before cell stack assembly. (However, a contact adhesive if used has the advantage it could be pre-cured using UV, and would maintain its tacky state during the drying out of the cell prior to cell assembly in the dry room.) Electrolyte can either be injected onto the porous separator 76 or, as described previously, capillary tubes can be embedded in bond lines when half cells are positioned together. Once the desired number of cell layers has been arranged, lay-up is held under vacuum to ensure intimate half cell contact. Copper contacts of the same polarity from adjacent layers could be bonded together with conductive adhesive at this stage and/or passed around the edge of the panel to rest on the top/bottom surface of the lay-up (as shown in FIG. 12). If silicon release flash tape is used to protect the exposed copper tabs, this can be peeled back post infusion with composite resin, leaving a copper tab bonded to the top surface of the panel which could be soldered to a wiring loom.

FIGS. 12a and 12b are respective sectional views of two further multifunctional composite constructions using similar cells with carbon/metal filament current collector fabrics and the same active materials, but illustrating alternative lay-ups where single and double sided half cells are used respectively in a panel of three cell layers.

Turning first to FIG. 12c, however, this is a schematic diagram of the final composite panel and, similarly to FIG. 2 above, shows one cell layer 62 comprising nine cells incorporated in a stack 64 of cell layers forming the composite panel. FIG. 12c shows how copper tabs 66 would be bonded to the carbon metal fabric at the edge of the layers using for example a conductive adhesive.

In the FIG. 12a construction, active material is applied to a single side only of each fabric layer and a dielectric layer of glass fabric 52 is positioned between a cell layer and adjacent cell layers. This arrangement allows improved structural integrity as composite resin is able to flow between adjacent cell layers 62. The second arrangement in FIG. 12b uses active material of the same type (e.g. all active cathode material 53, or all active anode material 55) printed on both sides of each carbon/metal fabric layer to make a continuous cell stack similar to how soft pack cells are arranged. This has a greater power density but may be more liable to lead to a weakened region in the final composite panel.

In both constructions the porous separator layer and glass fabric layers (both those above and below the three cell layers (and those interspersed between the single sided cells) extend across all nine cells and beyond the carbon fabric to prevent shorts. Copper foil tabs 59 attached to the respective carbon fabric layers link all half cells of the same polarity to carry current from the current collectors out of the panel.

This construction where the carbon fabrics also act as current collectors avoids any weight, rigidity or side reaction issues that can arise from coating current collector layers on glass fabrics. While weight may be further reduced by the use of localised patches of metal filaments (or other conductivity enhancing additions) in a carbon fabric, which patches would need to correspond to the desired active cell areas and be linked by conducting bars, it is cheaper to use uniformly conductive carbon fibres, providing that steps are taken to ensure adjacent layers do not cross circuit.

Validation of the Material System

In order to test the cell performance of the materials a test cell was constructed using the same active materials as described above in relation to the cell of FIG. 11. Thus, the single cell comprised the same carbon fabric interwoven with aluminium filaments as cathode current collector and printed with active cathode material, and the same carbon fabric interwoven with copper filaments as anode current collector and printed with active anode material separated by the same interposed electrolyte saturated porous separator. The single cell did not employ an adhesive (or use carbon sealing ink), but was instead sealed into conventional soft cell metal/polymer laminate packaging under vacuum, with copper tabs drawing current from the respective current collectors.

Figure 13:
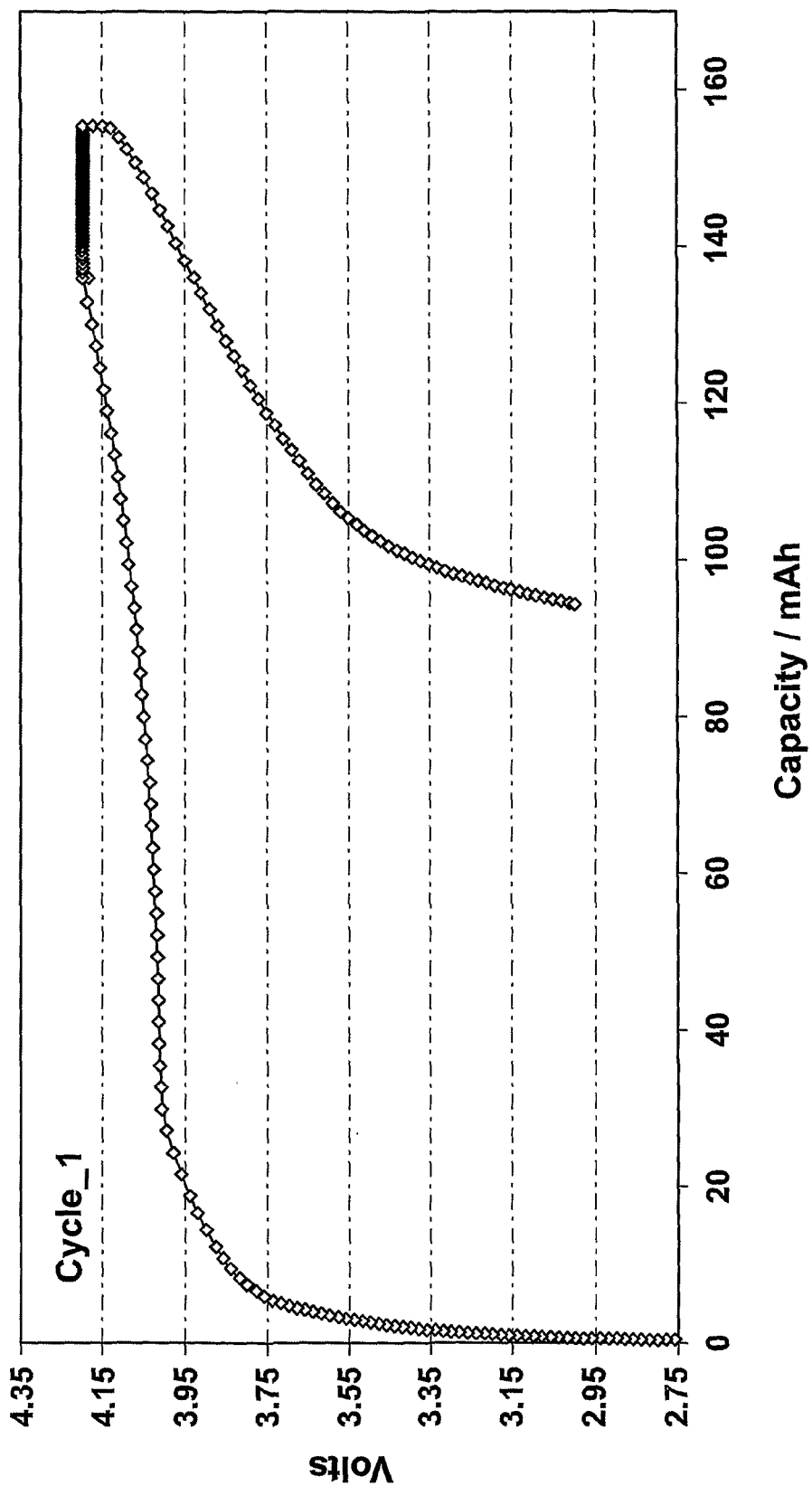
FIG. 13 is a graph of the first cycle performance of a test cell constructed using a carbon/metal filament current collector fabric; and, FIG. 14 is a graph showing the initial cycling performance of the same test cell constructed using a carbon/metal filament current collector fabric.
Figure 14:
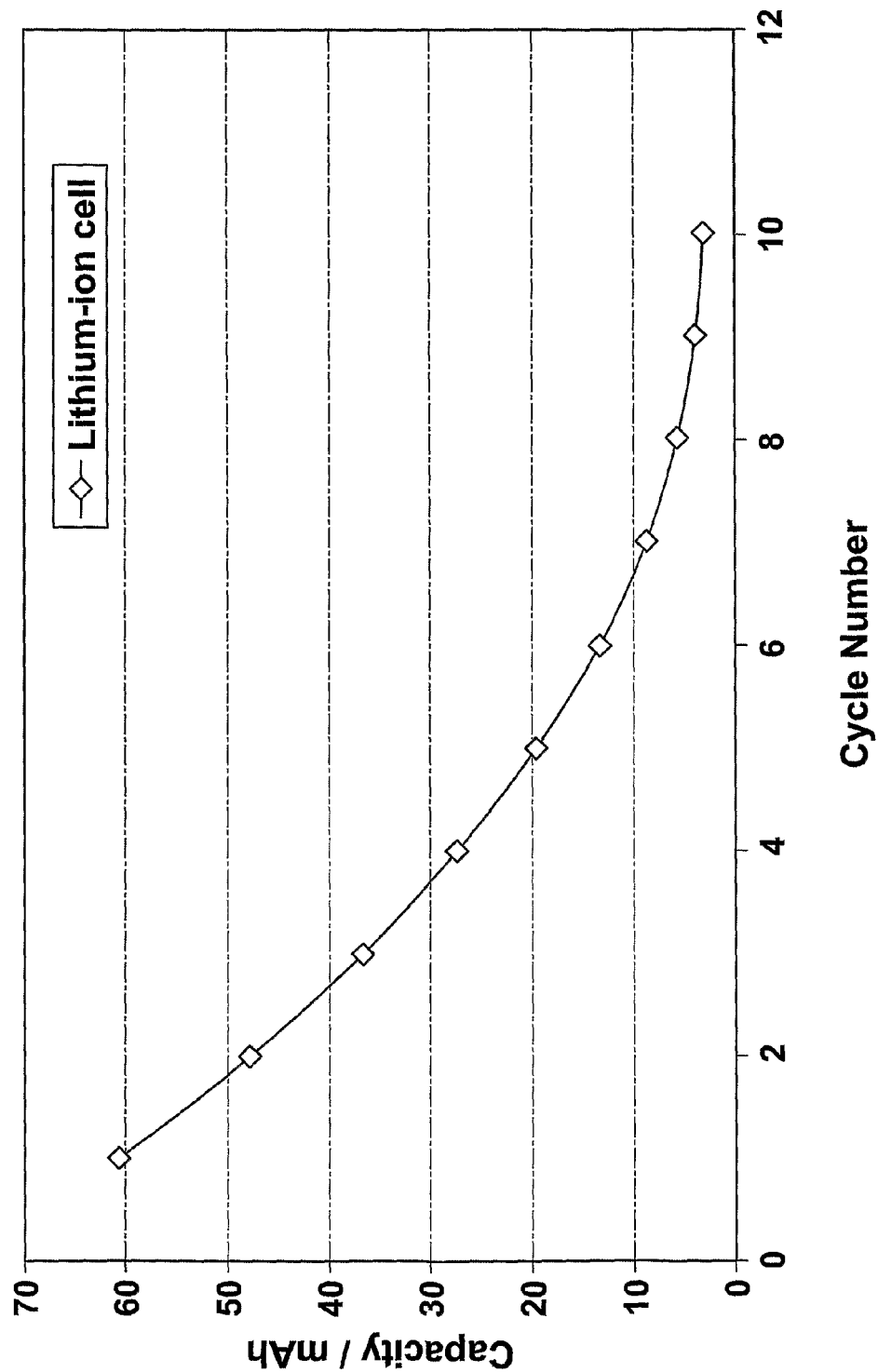

The proposed material system proved viable. Referring to FIG. 13, this is a graph of the first cycle performance of this prototype cell and shows a discharge capacity of 60 mAh. 160 mAh was expected from the mass of cathode material and the charge profile was indicative of a good lithium ion cell (i.e. not displaying problems of high internal resistance or material instability). FIG. 14 is a graph showing the initial cycling performance of the same test cell. The small discharge capacity and subsequently poor cycle life was apparently due to the basic nature of the prototype, although electrolyte may have been leaking out of the active region of the cell due to macro porosity in the half cells.

Further cells constructed using combined glass filament/metal filament showed better performance suggesting that, on the anode side, the carbon filaments and carbon sealing layer may have been acting as a poor anode material, intercalating lithium on charging but not releasing it on discharge giving a poor reversible capacity. In place of the carbon sealing layer, a nickel ink was found suitable to act both as a current collector layer and a sealing layer to seal the weave.

In summary, the present invention provides a simple and effective method of introducing electrical power storage functionality into FRC's. The preferred liquid electrolyte based cell solution permits high levels of performance to be obtained, while the proposed structure obviates the need for the usual packaging such cells require. The preferred screen printed solution offers a low cost and an easily scalable fabrication technique.

It will be appreciated that various modifications could be made to the cell structures still in keeping with the present invention and that although the present examples are based on lithium ion cells other suitable cell chemistries could be incorporated providing they can be integrally built up from the cloth interface. Moreover, in addition to the above-described lithium-ion chemistries the skilled person would recognise that other Li-ion chemistries could be applied, such as, $LiFePO_4$, $Li/Mn_2O_4$, $LiV_2O_5$, $LiV_6O_{13}$ or mixed metal oxide derivatives as cathode materials, while anode materials could include lithium titanate or other suitable anodes.

Furthermore, the invention is equally applicable to the lay-up of capacitor cells, which employ similar fabrication techniques including the printing of electrode materials, and especially to supercapacitors. These would include, for example, carbon based devices, PAN, NiOH/C or lithium titanate/C supercapacitor cells. Similarly to batteries, supercapacitors based on liquid electrolyte systems could also be incorporated in a composite.

As demonstrated above, printed or similarly coated current collector layers may be employed on a non-conductive composite fabric. Alternatively, the cloth layers may themselves inherently be conductive across their entire area or be provided with prearranged conductive patches and interconnecting paths, in which case the first cell component to be deposited on the cloth layer may be a shielding or sealing layer or an electrode ink. The printing of sealing mediums to seal regions of the cloth layer is also not necessary if the cloth layers are already provided with designated pre-arranged non-porous patches (e.g. already sealed or of a different material) or are arranged to have a suitable high weave density (and resulting low porosity).

Using gel or other solid electrolytes (with a corresponding reduction in cell power due to the lower electrolyte mobility) instead of liquid electrolytes is less desirable, but is still within the scope of the first aspect of the invention.

The invention claimed is:

1. A multi-functional composite comprising a plurality of cloth layers and a penetrating matrix material and having at least one cell for energy storage incorporated therein, wherein the cell is integrally deposited upon at least one of the cloth layers and comprises first and second electrodes separated by a porous, separator layer that has a liquid electrolyte-permeable, matrix-free intra-electrode region.

2. A multi-functional composite as claimed in claim 1, wherein liquid electrolyte is disposed within the liquid electrolyte-permeable, matrix-free intra-electrode region of the porous, separator layer.

3. A multi-functional composite as claimed in claim 1, wherein the composite comprises a supply network for supplying liquid electrolyte to the intra-electrode region.

4. A multi-functional composite as claimed in claim 1, wherein the at least one cell is integrally built up from only one cloth layer.

5. A multi-functional composite as claimed in claim 1, wherein the cell comprises a pair of half cells, each of which is integrally built up upon a cloth layer, and the half cells have been brought together to form a cell.

6. A multi-functional composite as claimed in claim 1, wherein the composite comprises two or more such cells that share a common separator layer extending between them.

7. A multi-functional composite as claimed in claim 1, wherein in the cell, all the respective electrode components are laid down by being integrally deposited as thin layers upon the cloth layer or upon other thin layers.

8. A multi-functional composite as claimed in claim 1, comprising a plurality of matrix material infused cloth layers overlaying one another and additionally held together by inter-laminar reinforcement.

9. A multi-functional composite as claimed in claim 1, wherein the cloth layers are either uniformly conductive across their area, or, are provided with conductive regions corresponding to the active cell areas, so that in either case they function as current collectors.

10. A multi-functional composite as claimed in claim 1, wherein one or more non-cell-bearing cloth or other dielectric layers is laid up adjacent a cellbearing cloth layer to prevent cross circuits.

11. A multi-functional composite as claimed in claim 1, wherein the composite is a continuous fibre reinforced composite, where the reinforcing fibres are glass or carbon fibres.

12. A multi-functional composite as claimed in claim 1, wherein the composite is in the form of a flat or curved panel.

13. A multi-functional composite as claimed in claim 1, wherein each cell is a battery or supercapacitor.

14. A method of preparing a multi-functional composite as claimed in claim 1 having at least one cell for energy storage incorporated in the matrix, comprising the steps of:—
   i) assembling a plurality of cloth layers, wherein the at least one cell is integrally built up from at least one of the cloth layers, each cell comprising first and second electrodes separated by a porous, separator layer that has a liquid electrolyte-permeable intra-electrode region for receiving liquid electrolyte; and,
   ii) infusing a matrix material into the cloth layer including the at least one cloth layer to form a matrix that penetrate the cloth layers but not the intra-electrode regions and hardens to form the composite.

15. A method as claimed in claim 14 and further comprising the step of:
   iii) introducing a liquid electrolyte into the intra-electrode regions, wherein the electrolyte filling step occurs before, during or after the matrix infusion step.

16. A method as claimed in claim 14, wherein in step i) each cell is initially formed as a pair of half cells, each of which is integrally built up upon a cloth layer, prior to combining the half cells.

17. A method as claimed in claim 15, wherein the electrolyte introduction step iii) is conducted prior to matrix infusion step ii) by introducing the liquid electrolyte directly onto the porous separator while the cell is being laid up.

18. A method as claimed in claim 15, wherein the electrolyte introduction step iii) is conducted after matrix infusion step ii) via a supply network through which the liquid electrolyte is introduced into the intra-electrode regions.

19. A method as claimed in claim 18, wherein step i) includes the laying down of a network of capillary tubes leading to the respective intra-electrode regions.

20. A method as claimed in claim 14, wherein step i) further includes adding inter-laminar reinforcement to secure the cloth layers together prior to matrix-infusion step ii).

* * * * *